US009633198B2

(12) United States Patent
El-Rafei et al.

(10) Patent No.: US 9,633,198 B2
(45) Date of Patent: Apr. 25, 2017

(54) DETECTING ANOMALOUS PROCESS BEHAVIOR

(71) Applicant: International Business Machines Corporation, Armonk, NY (US)

(72) Inventors: Sherif M. E. El-Rafei, Nasr (EG); Ahmed K. Farahat, Kitchener (CA); Hany M. Hassan, Redmond, WA (US); Tamer A. Mahfouz, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 14/181,188

(22) Filed: Feb. 14, 2014

(65) Prior Publication Data

US 2014/0165193 A1 Jun. 12, 2014

Related U.S. Application Data

(62) Division of application No. 12/170,508, filed on Jul. 10, 2008, now Pat. No. 8,719,190.

(30) Foreign Application Priority Data

Jul. 13, 2007 (EP) .................................... 07112421

(51) Int. Cl.
| | | |
|---|---|---|
| *G06N 7/00* | (2006.01) | |
| *G06F 21/50* | (2013.01) | |
| *G06F 11/07* | (2006.01) | |
| *G06Q 10/00* | (2012.01) | |

(52) U.S. Cl.
CPC .......... *G06F 21/50* (2013.01); *G06F 11/0715* (2013.01); *G06N 7/00* (2013.01); *G06Q 10/00* (2013.01); *G06F 11/0751* (2013.01)

(58) Field of Classification Search
CPC ................................ G06N 7/005; G06N 7/00
See application file for complete search history.

(56) References Cited

U.S. PATENT DOCUMENTS

| 6,604,093 B1 | 8/2003 | Etzion et al. |
|---|---|---|
| 2003/0149604 A1 | 8/2003 | Casati et al. |
| 2005/0267765 A1 | 12/2005 | Jeng et al. |

OTHER PUBLICATIONS

Dr. Math / Dr. Mitteldorf, "Two-Headed Coin and Bayesian Probability", The Math Forum post dated Apr. 21, 2003, available at http://mathforum.org/library/drmath/view/62710.html, accessed Aug. 16, 2016.*
G. Hamerly and C. Elkan, "Bayesian approaches to failure prediction for disk drives", Int'l Conf. on Mach. Learn., 2001, pp. 202-209.*
Brown, et al., "Class-Based n-gram Models of Natural Language" IBM T.J. Watson Research Center, 1992. Computational Linguistics vol. 18, No. 4, p. 467-479. [Online] Downloaded Jan. 31, 2012. http://delivery.acm.org/10.1145/180000/176316/p467-brown.pdf?ip=151.207.246.4&acc=OPEN&CFID=82490356&CFTOKEN=38739077&_acm_=1328027334_7762aa2251504e7.

(Continued)

*Primary Examiner* — Vincent Gonzales
(74) *Attorney, Agent, or Firm* — Maeve Carpenter

(57) ABSTRACT

A method for learning a process behavior model based on a process past instances and on one or more process attributes, and a method for detecting an anomalous process using the corresponding process behavior model.

5 Claims, 18 Drawing Sheets

(56) References Cited

OTHER PUBLICATIONS

Mohri et al., "Weighted Finite-State Transducers in Speech Recognition", Computer Speech and Language (2002), p. 69-88. [Online] Downloaded Aug. 24, 2011. http://www.sciencedirect.com/science?_ob=Mlmg&_imagekey=B6WCW-458NBGK-5-1&_cdi=6749&_user=2502287&_pii=S0885230801901846&_origin=&coverDate=01%2F31%2F2002&_sk=99.
Visual Studio 2005, "Default Arguments" Microsoft 2011. [Online] Downloaded May 12, 2011. http://msdn.microsoft.com/en-us/library/91563f79%28v=vs.80%29.aspx.
U.S. Appl. No. 12/170,508, filed Jul. 10, 2008.
EP Patent Application No. 07112421.8 filed Jul. 13, 2007.

* cited by examiner

DETECTING ANOMALOUS PROCESS BEHAVIOR

CROSS REFERENCE TO RELATED APPLICATION

This application is a Divisional application of pending U.S. patent application Ser. No. 12/170,508 filed Jul. 10, 2008.

This application claims the benefit of priority under 35 U.S.C. §119 from Application No. 07112421.8, filed on Jul. 13, 2007 in the European Patent Office.

FIELD OF THE INVENTION

The present invention relates to a method and system for monitoring processes, and more particularly for detecting as early as possible anomalous processes.

BACKGROUND OF THE INVENTION

As companies need to streamline and rationalize their business processes, they tend to rely more heavily on specific data processing systems specialized in business process management. Such systems provide specific components such as a scheduler, transaction management facilities, service discovery, etc., to enable task orchestration in a heterogeneous environment. IBM WebSphere Process Server is such a business process management system based on IBM WebSphere Application Server. Based on a process model defined in an associated development environment, such as IBM WebSphere Business Modeler, the process server can then execute workflows and monitor them to gather various statistics on the executed processes.

Monitoring systems gather statistics on key indicators to provide metrics on a company's processes and performance. An important monitoring activity is to detect faulty or anomalous processes. Traditional monitoring systems provide two approaches for detecting anomalous behavior in a monitored process. In the first approach, users manually employ sophisticated analysis techniques to detect significant situations, investigate their root causes, and then take the appropriate corrective actions. The main problem with this approach is that situations are detected after their occurrence, not while the process is performing. The second approach for anomalous behavior management depends on domain experts to define criteria for the detection of the anomalous behavior. These criteria are usually encoded in terms of condition-action rules which are used by the monitoring system to automatically detect and handle significant situations. The main problem with this approach is that it assumes a priori knowledge of the anomalous behaviors and therefore does not detect hidden, potentially more critical, situations.

The state of the art technique in situation management involves: (1) the use of sophisticated analysis techniques to manually detect situations and investigate their root causes; and (2) the use of rule-based monitoring to automatically detect predefined situations.

The first approach allows users to employ sophisticated analysis techniques to detect situations, and investigate their root causes. These techniques include multidimensional analysis, statistical analysis, and other data mining capabilities such as: clustering of data values; determining associations between data elements; discovering repeated sequences of events; classifying data into predefined classes; and predicting the values of data elements. There are two problems with this approach. First, users have to manually inspect a huge amount of events and data. Second, situations are detected after their occurrence, not while the process is performing.

The second approach for situation detection depends on rule-based monitoring of the running instances. This approach allows domain experts to define criteria for the detection of critical situations. These criteria are encoded in terms of condition-action rules which are used by the system to monitor the running instances. Many inventions have proposed frameworks for defining and managing complex situations. For example, the U.S. patent application US 2005/0267765A1, filed by Jun-Jang Jeng et al., and entitled "Apparatus and Method for Policy-driven Business Process Exception Handling" provides an exception management framework that allows developers to define exception policies in a declarative manner. Also, U.S. Pat. No. 6,604,093, filed by Opher Etzion et al., and entitled "Situation Awareness System", provides a method for situation management that allows users to define complex events using event composition operators. The main problem with this approach is that it only covers obvious situations, and does not allow the detection of hidden, potentially more critical, situations. Also, the process of manually defining detection criteria is inefficient, time consuming, and error-prone.

To solve some of the problems encountered in traditional situation management approaches, U.S. patent application US 2003/0149604A1, filed by Fabio Casati et al., and entitled "Exception Analysis, Prediction, and Prevention Method and System", proposes a method that uses data mining techniques to generate classification rules that identities normal from exceptional process instances. The method is based on a training set of previously "labeled" process instances. The generated rules can be either investigated by the users to identify the causes of exceptional behavior or stored in a repository and compared with running instances to automatically detect exceptional behaviors. This method has several problems. First, the method depends on labeled process instances to train the classifier and therefore it can only detect previously-known exceptions. Moreover, the classification rules do not encode the dynamic behavior of the process instance (i.e., the change of state). This means that the approach does not detect process instances that exhibit exceptional sequence of states/events.

SUMMARY OF THE INVENTION

According to a first aspect of the present invention there is provided a method for learning a behavior model of a workflow, the behavior model being associated with at least one value falling within a first predetermined range, and comprising a first set of paths, wherein a union of the paths form a directed graph corresponding to the workflow, the directed graph comprising a second set of nodes and a third set of transitions, wherein the method comprises: for each path comprised in the behavior model: identifying a fourth set of instances of the workflow among all instances of the workflow, wherein each of the instances to identify is associated with a value falling within the first predetermined range and any of the instances to identify corresponds to the path; computing a likelihood of the path as a function of the number of instances so identified; and assigning a weight to each transition of the third set of transitions as a function of the likelihood of the paths comprising the transition.

One advantage is that the behavior model can be used for detecting anomalous processes that are either already executed or still running. A further advantage is that the behavior model can be continuously updated based on more recent process instances.

According to a second aspect of the present invention, there is provided a method for monitoring an instance of a workflow, the instance being associated with a first value and with a first directed graph comprising a first set of nodes and a second set of transitions, the method comprising: identifying a behavior model, so that the first value falls within a predetermined range associated with the behavior model, and wherein the behavior model comprises a path which is a superset of the first directed graph; computing a likelihood of the instance as a function of weights associated with the transitions of the behavior model corresponding to the second set of transitions; and deciding on a normality of the instance as a function of the likelihood so computed and of a threshold.

One advantage is that both executed and running instances can be analyzed and detected. A further advantage is that no specific rules are necessary to analyze a process and the proposed method can be used for any type of process.

According to a third aspect of the present invention, there is provided an apparatus for carrying out the method according to the first or second aspect of the invention.

One advantage is that this apparatus can be obtained very easily, thus making the method easy to execute.

According to a fourth aspect of the present invention, there is provided a computer readable medium comprising instructions for carrying out the method according to the first or second aspect of the invention.

One advantage is that this medium can be used to easily install the method on various apparatus.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements.

DETAILED DESCRIPTION OF THE INVENTION

Figure 16:
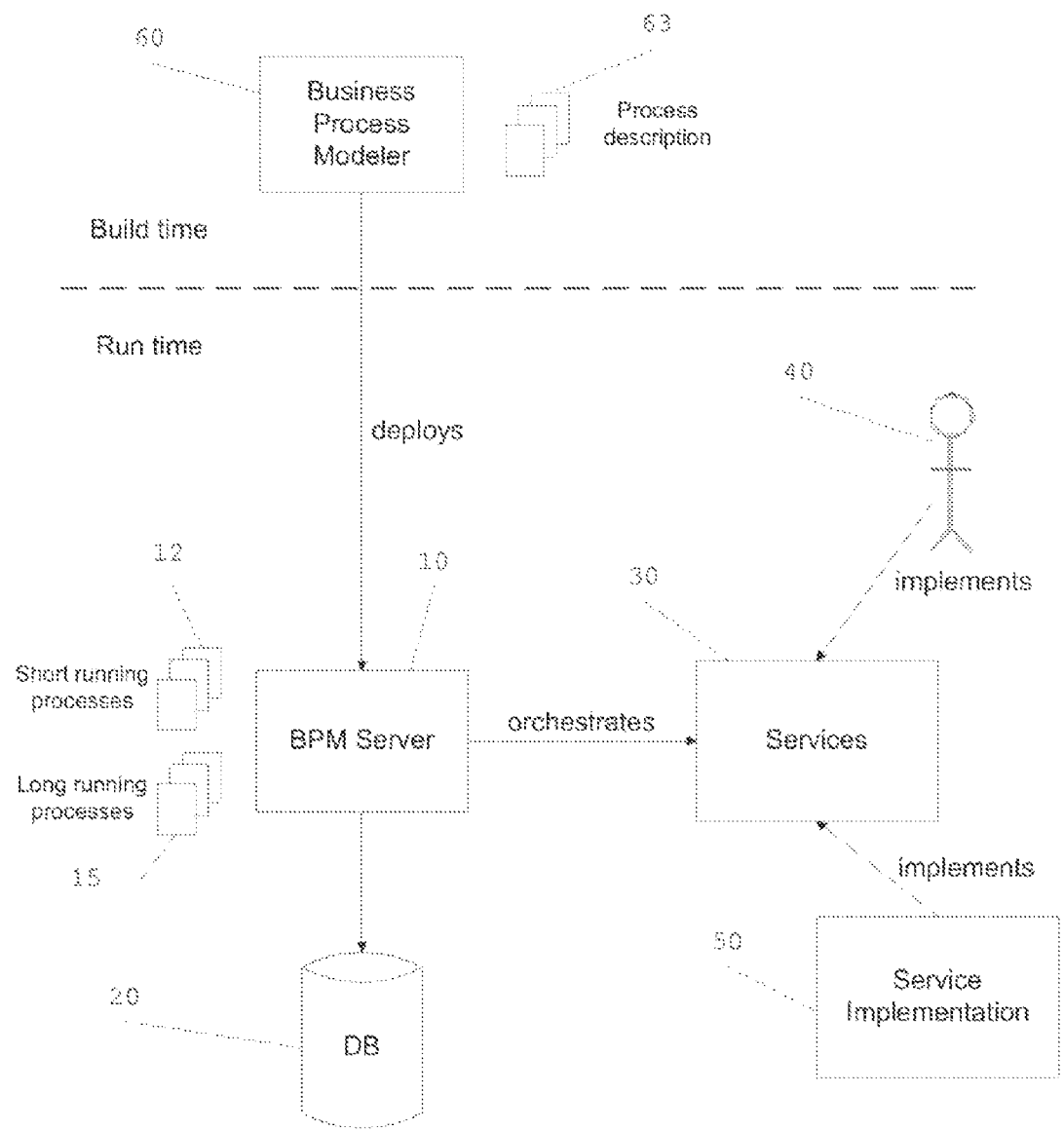
FIG. 16 shows a business process management system in which the present invention can be implemented.

FIG. 16 shows a business process management system in which an embodiment can be implemented. The system includes a Business Process Management (BPM) server (10), which manages the execution of business processes; processes, which can be short running (12) or long running (15); a database (20), used for long term storage of process information; a set of services (30), which can be implemented by a computer (50) or by a human (40); and a business process modeler (modeler) (60), which is used to build a process description (63).

The modeler (60) interacts with the BPM server (10) so as to load or deploy a process description (63) in the BPM server (10). After a particular event is detected, the BPM server (10) will instantiate a process from the process description (63). The process instance can be short running (12), stored in the BPM server (10) memory, or long running (15), stored in the database (20). During the execution of the process instance (12 or 15), the BPM server (10) orchestrates different services (30) by interacting with their service interface. These services (30) can be implemented by a human (40) or by a computer (50).

As business processes take a more important part in the life of an enterprise, various technologies have been developed to facilitate their management, from the definition phase to the execution and analysis phases. Various tools and standards have been put in place so that most of the industry needs are met while maintaining a maximum of operability between systems and maximizing the productivity of the persons involved.

Thus, the business process modeling language (BPML) has been developed as a standard to allow a common description of a business process. From that description (63), tools can derive code that will be executed by the BPM server (10). Such code is often described by specific workflow languages such as the workflow description language (WFDL) developed by IBM, or the business process execution for web services (BPEL4WS). The same process can be executed as short running (12) or long running (15). The main difference will be the type of storage on which the process variables will be stored. Short running processes that are meant to have a short life span, will be preferentially stored in the BPM server memory. Long running processes with a long life span that should survive a server reboot are typically stored in a database (20). These processes can also provide additional functionality such as transaction management or compensation. During the execution of the process or workflow, the BPM server (10) will orchestrate or coordinate various task or activities, which can be code running on the BPM server (10) itself or on a remote server (50), or which can be implemented by a human (40), like an approval task for instance. Remote systems cooperating with the BPM server (10) are often called partners. The IT industry has defined standards so that different systems can cooperate and execute remote procedure calls on each other. These remote procedures can be accessed through interfaces often called services (30). A well known standard for such services is the web service standard, which relies on a set of technologies such as SOAP (Simple Object Access Protocol) or WSDL (Web Service Description Language).

In general, a process is a naturally occurring or designed sequence of changes of properties/attributes of a system/object. This definition of a process covers, but is not limited to, business, industrial, and natural processes. The state of a process at a particular moment of time defines the values of the properties/attributes of the system/object at that moment. An event is an occurrence of changes that moves the process from one state to another. The process can be fully described by defining the possible set of states and the events which move the process from one state to another. A process instance is an occurrence of the process that goes through a subset of the process states/events. The sequence of the states and events of a process instance is called the behavior of the process instance. This behavior depends on the properties/attributes of the instance. The instance may exhibit a behavior which deviates from what is expected. This behavior is an anomalous behavior that needs to be detected and handled. The anomalous behavior is sometimes called a situation, or an exception. This process of detecting and handling anomalous behavior is called anomalous behavior management, situation management, or exception management.

A business process description (63) is typically a directed graph with one start node, one or several end nodes, and a plurality of nodes connected to at least two nodes. Examples of a typical business process will be described with respect to FIG. 6. A business process can also comprise a set of variables, or process properties, such as the customer id for a sales process, the price for a sales order, etc. Among these properties, some of them will be used to distinguish the different process instances derived from a process definition. Thus, from a single process definition, many different process instances can be created. It is also possible to make a process more generic and pass some parameters at construction time. For instance, a review process and an approval process can have the same steps, but a higher process priority, or an extra activity can be set in the case of an approval process. Also, different process definitions can be developed to model processes that are actually quite similar. Thus an approval process for an internal document and an approval process for an external process can comprise exactly the same steps, and store the same variables, but still be modeled by two different process description objects for regulatory compliance reasons. Hence, given a process instance, it is possible to analyze its normality from different point of views, either taking into account the values of its parameters, or the process definition to which it is linked, or both.

While a business process is typically represented by a set of nodes and links connecting the nodes, there are two main representation types of business processes that are commonly used. In one type, the nodes represent activities and the links represent data passed from one activity to the next. This kind of representation is often called an activity diagram. Another type is a state diagram, wherein the nodes represent states of the business process (such as order completed) and the links represent activities.

Figure 1:
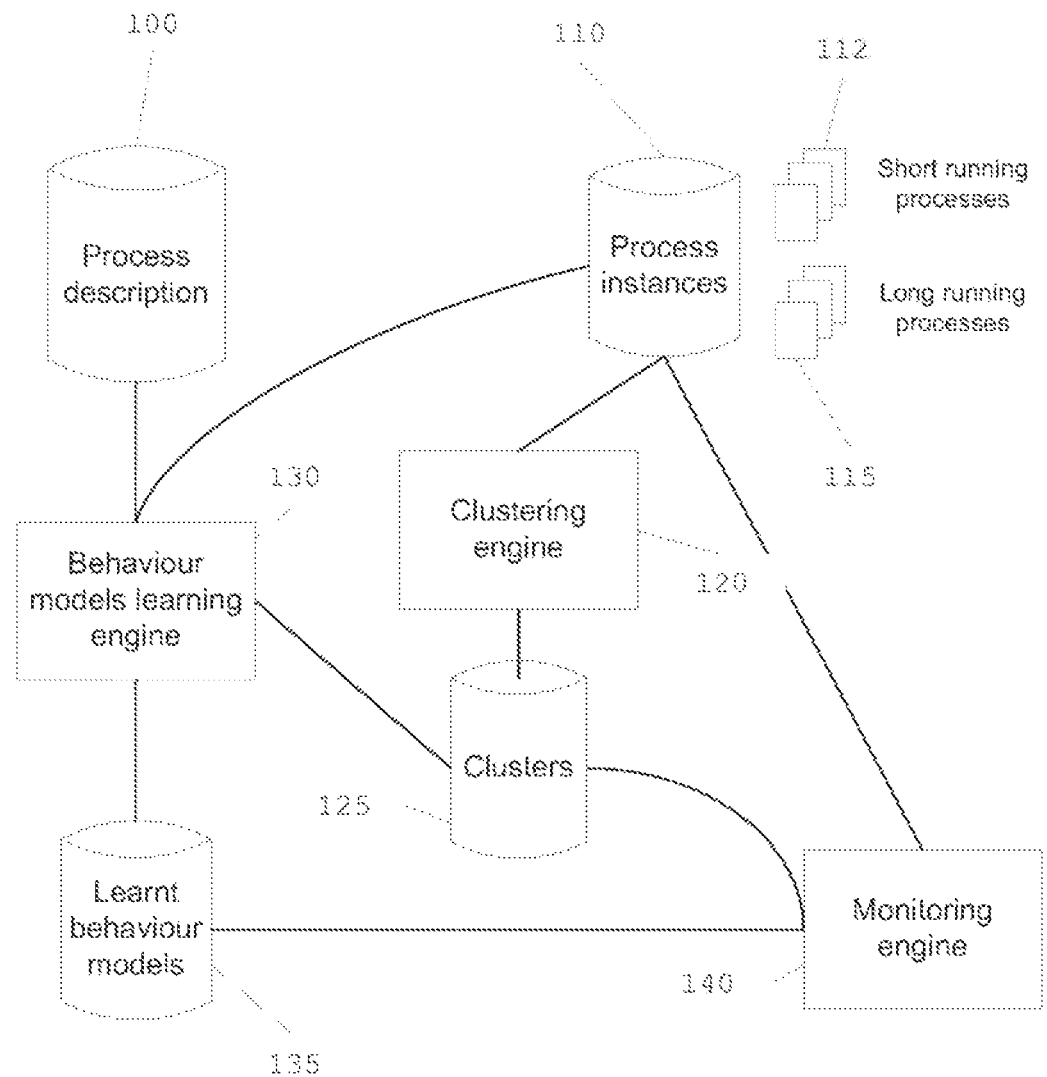
FIG. 1 shows a system implementing the present invention.

FIG. 1 shows a system implementing an embodiment. The system includes: a process description repository (100), storing a representation of a business process, defined using a modeling tool such as the business process modeler (60) described with respect to FIG. 16; a repository of process instances (110), storing the actual processes created from a process description (100), the processes being either short term (112) or long running processes (115); a clustering engine (120) relying on a clusters repository (125); a behavior model learning engine (130) relying on a repository of learnt behavior models, which will be described more in details with respect to FIG. 6; and a monitoring engine (140) for monitoring and analyzing the running processes.

The WFST learning engine (130) relies on the process description (100), the process instances (110) and the clusters (125) repositories to learn the WFSTs that are then stored in the learnt WFSTs repository (135). The clustering engine (120) analyzes the past or running process instances (110) to derive the relevant set of clusters (125). The monitoring engine (140) monitors the process instances (110), either executed or running, and links with the clusters (125) and WFSTs (135) repositories to detect anomalous behavior in a process.

The system represented in FIG. 1 can be implemented in the BPM server (10) described with respect to FIG. 16, and the database (20) of FIG. 16 can be used for storage of the repositories (100, 110, 125, 135) of FIG. 1.

Process descriptions (63) are loaded in the process description repository (100) by the business process modeler (60). When the BPM server (10) gets a request for a new process to be started, it creates a new process instance in the process instance repository (110), using the associated process description (63) as a template. A process instance can have many attributes, such as a customer number, a sales order amount, etc. Some attributes, for example a work order id, can be used to distinguish processes instantiated from the same process description and having very close attributes values, for example a same customer ordering the same item but for two different shipping addresses. A process instance is typically described using the Business Process Execution Language (BPEL), which is based on XML (Extensible Markup Language).

Once created, the process is executed and managed by the BPM server (20). The process can be monitored by the monitoring engine (140) during its execution, also called on-line monitoring which will be described in more details with respect to FIG. 14, and the monitoring engine can also analyze executed process instances, also called off-line monitoring which will be described in more details with respect to FIG. 12. The monitoring engine (140) will monitor process instances to detect anomalous process behavior.

The behavior of a process instance is defined to be the sequence of states/events observed during its execution. This behavior depends on the properties/attributes of the system/object(s) associated with the process instance (e.g., the behavior of a sales order process depends on the customer type, the product type, and the quantity of items). This means that, "instances with similar properties/attributes have similar sequence of states/events" and "instances with properties/attributes similar to normal instances that have different sequence of states/events are anomalous" (e.g., customers with credit lines will get their sales orders accepted, and it is anomalous to see customers with credit lines who got their orders rejected). This means that, to model the normal behavior of a process, the system has to learn a behavior model for each group of instances that have similar properties/attributes.

Two phases are required: the learning phase, and the run-time phase. In the learning phase, the clustering engine (120) uses hierarchical clustering techniques to organize the space of all process instances (110) into a tree of clusters (125). Each level of the tree represents a degree of similarity. The WFST learning engine (120) then learns, for each cluster, a dynamic probabilistic model (135) that represents the sequences of states for training instances that belong to that cluster. The details of the learning phase are described in more details with respect to FIG. 8.

After the learning phase, the monitoring engine (140) monitors the behavior of running or executed instances. Each instance belongs to one or more clusters, stored in the clusters repository (125). The monitoring engine (140) identifies these clusters, and continuously calculates, for each cluster, the probability that an instance with the associated properties/attributes exhibits the observed behavior. For that it relies on the repository of learnt behavior models (135). This probability represents a measure of normality for the associated instance. If this measure goes below a predefined threshold, the system will alert the user that the associated instance is anomalous. The details of the run-time phase are described with respect to FIG. 14.

The components system presented in FIG. 1 can be grouped together in the same server or be spread onto different collaborating servers. The repositories (110, 100, 125, 135) can be stored in short term memory, such as RAM, or long term memory, such as compact flash or hard drives.

The components can also interact in various modes, while keeping the same overall functionality. Thus, for example, the clustering engine could take into account the process description (100) to organize the process instances, in addition to process properties. The monitoring engine (140) could rely only on the learnt WFSTs repository (135) to monitor the process instances (110).

Figure 2:
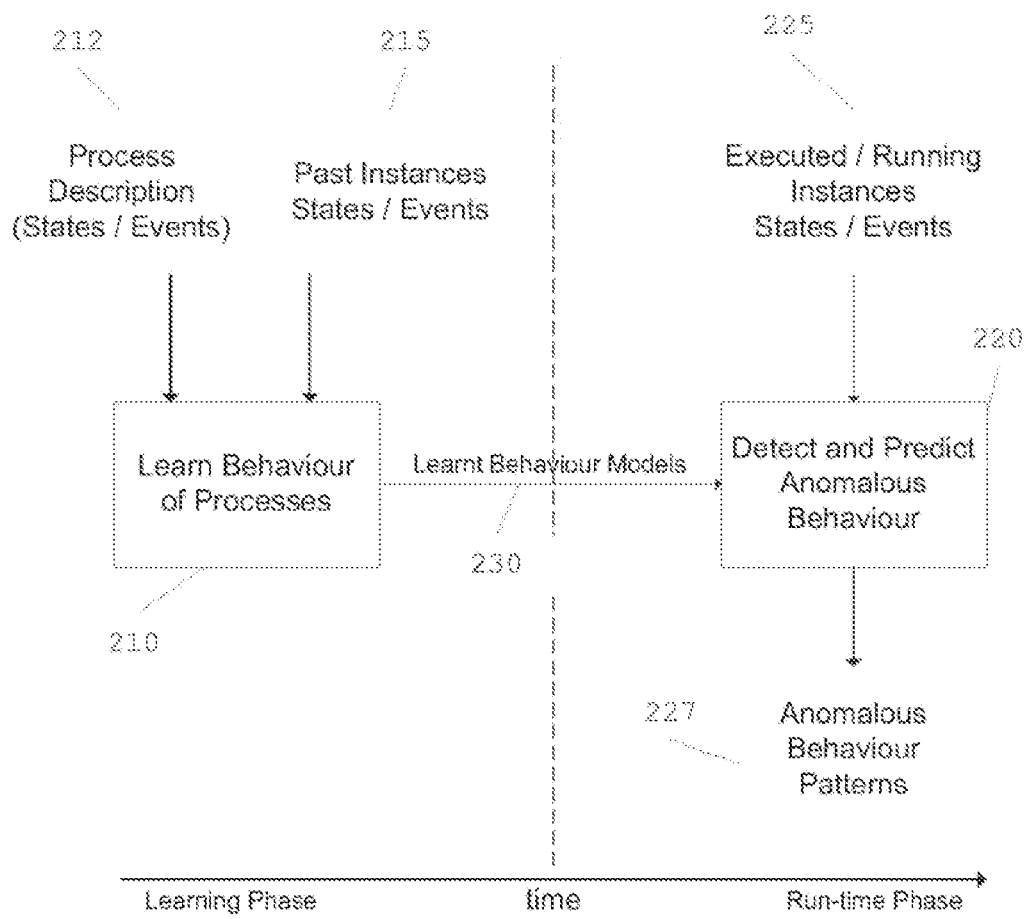
FIG. 2 is a high level process depicting an implementation of the invention.

FIG. 2 shows a high level process with the main steps in an implementation of an embodiment. The process includes: a phase during which the behavior of processes is learnt (210), which takes as input the process description (212) and the past process instances (215), and which produces a set of learnt behavior models (230) described in more details with respect to FIG. 6; and a phase (220) during which the behavior of processes is analyzed so as to detect and predict anomalous processes behavior, which takes as input the learnt behavior models (230) and the set of executed or running process instances (225), and which produces a set of anomalous behavior patterns.

FIG. 2 shows an overview of a method for detecting anomalous behavior patterns in computer-monitored processes. The method involves two phases. In the first phase, the method learns the normal behavior of the process from the behavior of past process instances. In the second phase, the method uses the learnt behavior to identify significant situations in finished processes or predict that some process in execution is highly probable to be anomalous and might be prevented. As opposed to traditional approaches, the proposed approach automatically detects hidden, previously unknown, situations before they occur. Moreover, the approach does not depend on predefined rules for detecting anomalies and does not need domain-specific knowledge as it automatically learns the normal behavior from the past process instances. The disclosed method provides a kind-of-expert watching over the process execution. Eventually, it may also be combined with the process simulation tools to detect potential future situations.

As opposed to traditional approaches, the proposed method detects hidden, potentially more critical, situations while the process is performing, not after they have occurred. Moreover, the approach automatically learns the normal behavior from the previous process instances, and does not depend on domain-specific knowledge, predefined rules or on labeled instances. The method first learns the normal behavior of the process from the behavior of the past instances, and then classifies as anomalous any deviation from that behavior. The method is based on the fact that "given a large set of a process instances, the dominant behavior of these instances characterizes the normal behavior of the process".

The learning phase (210) precedes the run-time phase (220). In the learning phase (210), the method learns the normal behavior of the process from the behavior of the past instances. The learning phase involves two steps: grouping of similar instances into clusters, and learning a behavior model for each cluster. The system can also learn continuously, and adapt the learnt process behavior to new conditions, for example by emphasizing the recent behaviors with respect to old ones.

In the run-time phase (220), the method uses the properties/attributes of running instances to identify the clusters to which they belong, and uses the learnt models for these clusters to judge the execution of these instances. The method classifies as anomalous any deviation from the learnt behavior in any of these clusters. The proposed model allows the detection of anomalous patterns in executed instances (off-line monitoring) and the prediction of anomalous patterns in running instances (on-line monitoring).

In off-line monitoring, the method uses the learnt behavior models to evaluate executed (i.e., finished) instances. The process proceeds as follows:
1. The method captures the behavior (i.e., sequence of states/events) of the executed instance and the associated properties/attributes;
2. The method identities the clusters to which the instance belongs;
3. For each cluster:
    a. The method calculates the probability that the instances belonging to this cluster (i.e., have the associated properties/attributes) exhibit the behavior of the executed instance;
    b. If this probability goes below a specified threshold (threshold computation is described in detail with respect to FIG. 15), the method classifies the executed instance as anomalous. The significance of the anomalous behavior depends on the significance of the cluster.

In on-line monitoring, the method predicts the anomalous behavior before the completion of the process instance. The process proceeds as follows:
1. The method captures the properties/attributes of the running instance;

2. The method identifies the clusters to which the instance belongs;

3. The method continuously monitors the states of the running instance;

4. When the process instance enters a new state, for each cluster:

a. The method calculates the probability that the instances belonging to this cluster (i.e., have the associated properties/attributes) go through the states observed from the start of the running process instance;

b. If this probability goes below a specified threshold, the system will alert the user that the running instance is anomalous. The significance of the anomalous behavior depends on the significance of the cluster.

Figure 3:
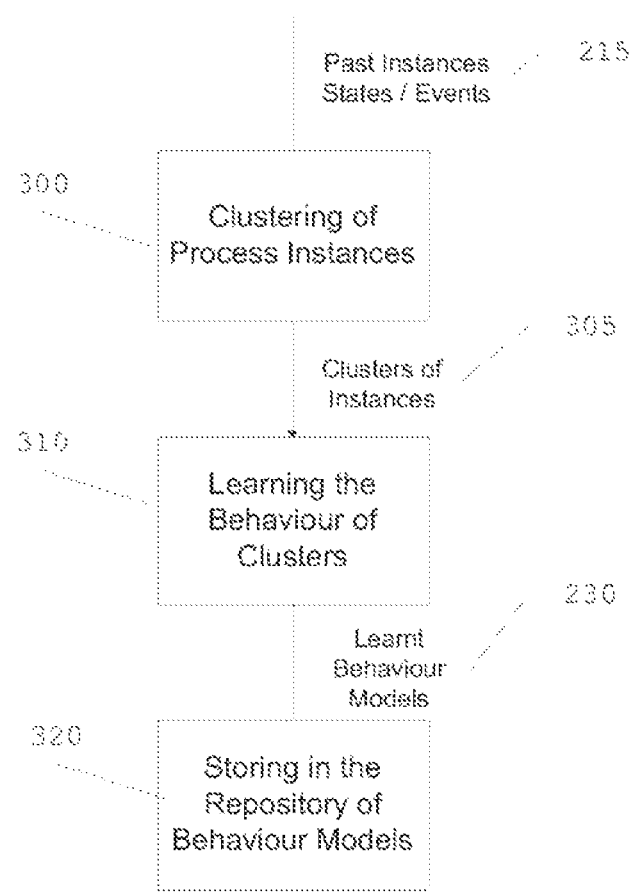
FIG. 3 shows a high level process of the learning phase in an implementation of the invention.

FIG. 3 shows a high level process of the learning phase according to a main embodiment. The process includes: clustering of process instances (300), taking as input the past instances states/events (215), and producing as output the clusters of instances (305); learning of the behavior of clusters (310), taking as input the clusters of instances (305), and producing as output the learnt behavior models (230); and storing in the repository of behavior models (320) the learnt behavior models (230).

Figure 4:
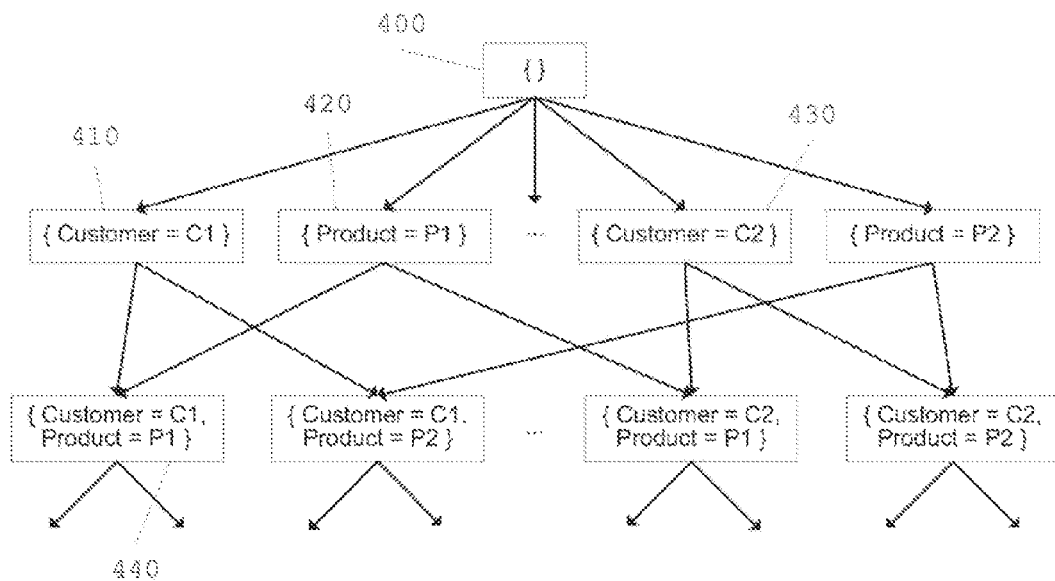
FIG. 4 shows a hierarchical clustering of process instances.
Figure 5:
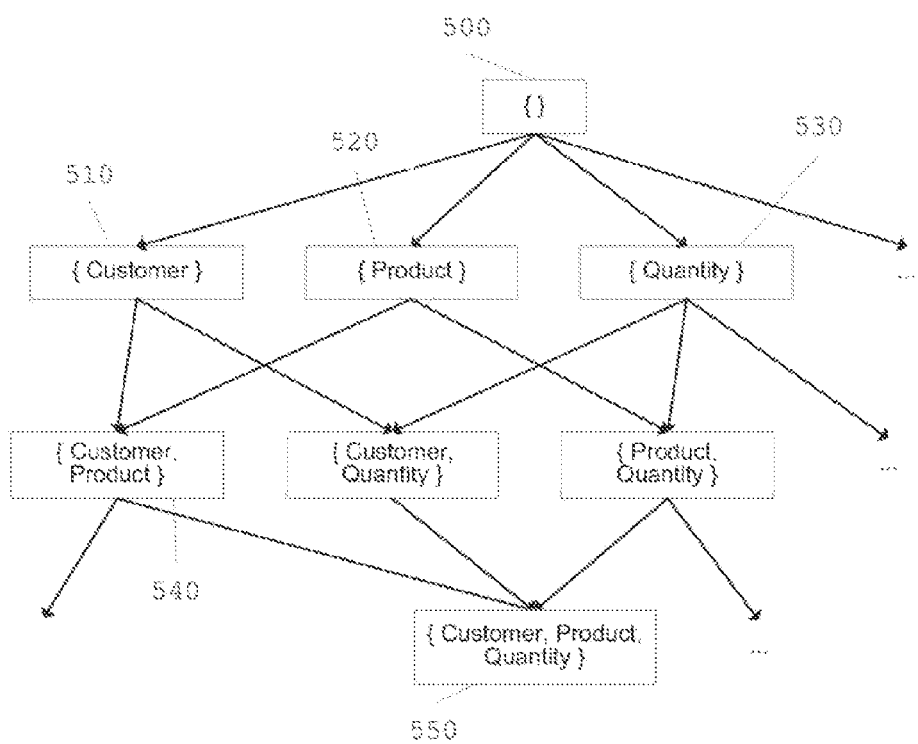
FIG. 5 shows the search space for frequent patterns in an implementation of the invention.

The learning phase (210) includes: grouping past process instances with similar properties/attributes into clusters (300), this step is described in more details with respect to FIGS. 4 and 5; and learning a common behavior for each cluster (310).

After clustering the past instances (300), the method learns for each cluster a dynamic probabilistic model that represents the behavior of all instances belonging to that cluster (310). The behavior of a process instance is defined to be the sequence of states/events observed during its execution. The probabilistic model captures the sequences of states executed in all instances belonging to a cluster and assigns a weigh for each sequence proportional to its frequency of occurrence in these instances. This weight represents a measure of normality for the associated sequence.

The process description defines the possible set of states and the events that move the process from one state to another. In an implementation, the method uses this description to define a behavior model that accepts all possible sequences of states, not only the states observed in past instances. The method also assigns a small normality measure for possible sequences that were not observed in past instances. The inclusion of all possible sequences in each behavior model allows efficient representation of behavior models.

Many probabilistic modeling techniques can be used to model the dynamic behavior of the process instances (e.g., Hidden Markov Model (HMM), Dynamic Bayesian Networks (DBN), state-space models, Weighted Finite State Transducers (WFST)). The structure of these models can be easily extracted from the process description and their parameters can be estimated from the behavior of the training instances. An implementation of the main embodiment uses Weighted Finite State Transducer (WFST) to model the behavior of process instances is described with respect to FIG. 8.

FIG. 4 shows a hierarchical clustering of process instances based on the processes properties or attributes. The space of processes can be organized in different overlapping clusters: a cluster can represent the set of all processes (400); it can be the set of processes related to a particular customer (410; 430) or to a particular product (420); and it can also represent the set of processes related to particular customer and product (440), etc.

The method divides the past process instances into overlapping clusters based on their properties/attributes. Each cluster represents instances with similar properties/attributes. The method employs a hierarchical clustering technique that organizes the process instances into a tree of clusters as shown in FIG. 4.

The method defines multiple degrees of similarity between process instance properties/attributes. Two instances are perfectly similar if they have the same values for all properties/attributes, and they are weakly similar if they have the same value for only one property/attribute. Each level of the tree represents a degree of similarity. The root node represents all the instances of the process. Each node on the ith level represents instances that have the same values for i attributes. If the instances have n attributes, there will be n similarity degrees and n levels of clusters.

Each cluster is assigned a weight that represents its support in the training instances. This weight affects the evaluation of executed and running instances that belong to that cluster. Deviations in the behavior of frequent clusters are more important than deviations in the behavior of rare clusters.

The problem with the clustering process is the huge space need to be explored. This makes tree construction computationally expensive. The method reduces the clusters space as follows:

a. The method groups the values of continuous attributes into ranges (e.g., quantity attribute values may be grouped into the following ranges 0-100, 100-10000, >10000). Each node represents a range of values instead of a single value. The ranges are extracted automatically from the histogram of all values seen in the past instances. It is also possible to group attributes with discrete values in the same cluster if they are not representative enough when taken in isolation.

b. The method prunes clusters with "low" support in the training instances.

An implementation using a frequent pattern mining algorithm performing hierarchical clustering in an efficient way is described with respect to FIG. 5.

FIG. 5 shows the search space for frequent patterns according to the main embodiment. The search space can be organized as a tree of patterns structures: with a root node (500) representing all the patterns and all the past instances; with first level nodes (510, 520, 530) representing patterns and past process instances having one attribute or property at a certain value (for instance customer=C1); and with second level nodes (540) representing patterns and past process instances having two attributes at certain values (for instance customer=C1 and product=p2); and so on for higher levels (550).

As the number of possible patterns is extremely large, it is desirable to optimize the search space to make the clustering process more efficient. To that end, a frequent pattern mining algorithm can be used to discover clusters whose support is greater than a predefined threshold in an efficient manner. An example of a frequent pattern mining algorithm is presented in the document by Haixun Wang, Chang-Shing Perng, Sheng Ma, Philip S. Yu, "Mining Associations by Pattern Structure in Large Relational Tables", Proceedings of the 2002 IEEE International Conference on Data Mining (ICDM'02). Each cluster is represented by a pattern of instance properties/attributes (e.g., Customer=c1, Product=p2). The frequent pattern algorithm performs a level-wise search that organizes the search space as a tree of pattern structures. Each node (500, 510, 540, etc.) in the search space maintains a list of the patterns it represents along with the support of each pattern in past instances. The algorithm reduces the search space based on an extended "downward closure property" between parent and child pattern structures in the search tree (e.g., if patterns of structure {Customer, Product} (540) are not frequent, patterns of structure {Customer, Product, Quantity} (550) are not frequent too). This improves the performance significantly especially in handling high dimensional properties/attributes.

The organization of the search space shown in FIG. 5 is similar to the tree structure used to represent the clusters as described with respect to FIG. 4.

Each node in the search space is described by a subset of properties/attributes and represents all clusters described by the values of these properties/attributes (e.g., clusters described by Customer, Product attributes).

The problem of mining the search space is a frequent problem in data mining techniques, in particular in association rule learning. Other algorithms can be used to organize the search space, such as the K-optimal pattern discovery algorithm, sequence mining or itemset mining techniques, the a priori algorithm, or the FP-Growth algorithm.

Figure 6:
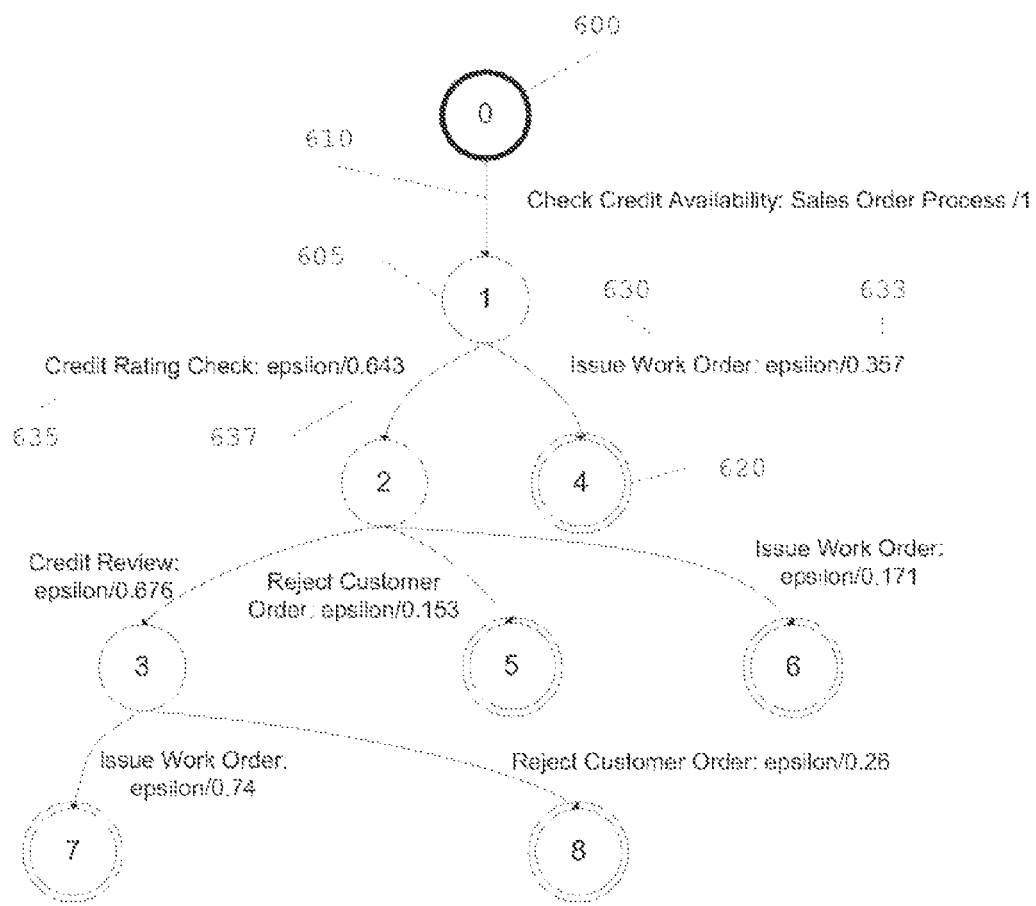
FIG. 6 shows a sample Weighted Finite State Transducer (WFST) that represents the behavior of a business process.

FIG. 6 shows a sample Weighted Finite State Transducer (WFST) that represents the behavior of a business process, in an implementation of the main embodiment. The WSFT comprises: at least one starting node (600); at least one ending node (620), which are represented in FIG. 6 with two concentric circles; any number of intermediate nodes (605); links (610) between the nodes; and activities (635, 630) and probabilities (637, 633) associated with the links.

Each intermediate node (605) has at least one incoming link and at least one outgoing link. A starting node (600) has at least one outgoing link and an ending node (620) has at least one incoming link. The probabilities of the outgoing links (637, 633) of a node must sum to one as the WFST represent all the possible sequences of events for a given process. It is possible for a link to loop back to the same state or to a previous state. Although not represented in FIG. 6, data can flow through the diagram to pass from one activity (635, 630) to another. Activities usually invoke services (30) implemented outside the BPM server (10), either by humans (40) or by computers (50).

Weighted Finite State Transducer (WFST) are used to represent the behavior of a cluster of process instances. The WFST shown in FIG. 6 is an example of a learnt behavior model (230), output of the behavior models learning engine (130). A WFST corresponds to a particular cluster node such the node "customer=C1" (410) described with respect to FIG. 4. It is thus important to reduce the search space during the clustering phase, described with respect to FIG. 5, as it will direct the number of WFST to manage. Each state in the WFST represents process state and each transition represents the occurrence of an event. The WFST maps the execution of a sequence of states/events to the execution of the process that generates that sequence. Each event is assigned a weight proportional to frequency of occurrence in the past instances. The legal sequences of events are specified by the arc labels along each complete path, and their probabilities by the product of the corresponding transition probabilities. FIG. 6 shows the WFST of a sample sales order process. The sales order process is a business process. In business processes, the event that moves the process from one state to another is a business activity (e.g., Check Credit Availability). Epsilons represent no-event transition.

While the use of WFST is preferred, other stochastic processes can be used to implement the main embodiment, such as Markov Chains, Hidden Markov Model, Dynamic Bayesian Networks, state-space models, Wiener process, etc.

Figure 7:
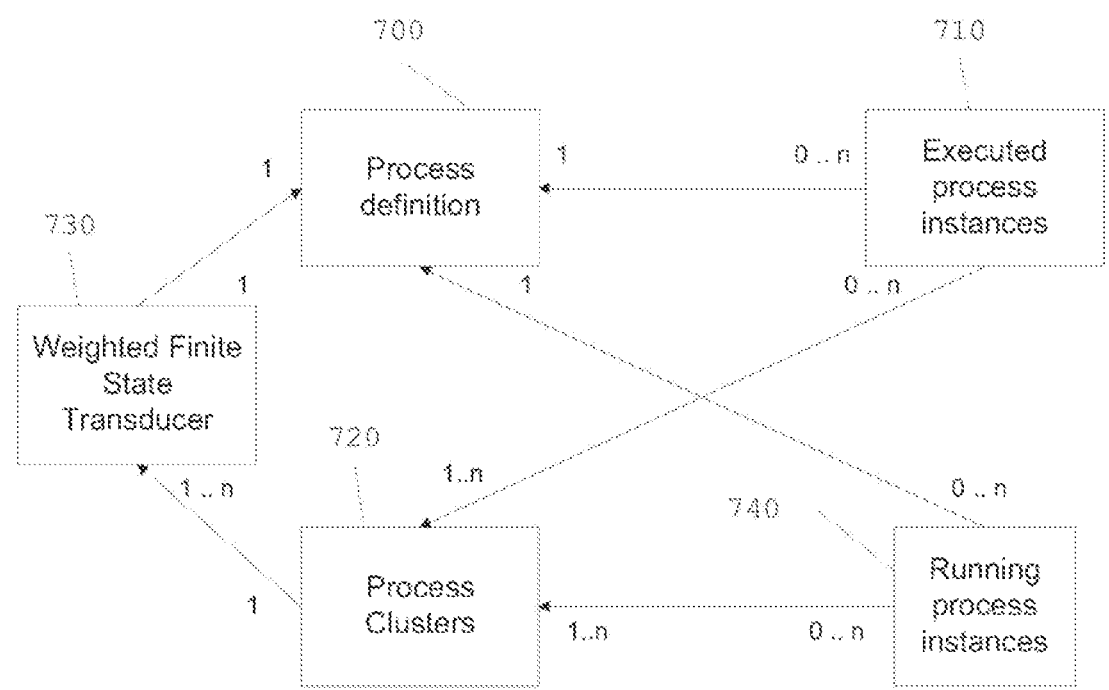
FIG. 7 shows an overview of the data model in an implementation of the present invention.

FIG. 7 shows an overview of the data model in an implementation of the main embodiment. The elements typically stored in the BPM database (20), in an implementation of the main embodiment, comprise: process definition data (700); executed process instances (710); process clusters (720); learnt WFSTs (730); and running process instances (740).

The process definition (700) is the starting point defining the set of legal state sequences. For a given process definition (700) there exist any number of executed or running process instances (710, 740) that are generated from this process definition. These process instances (710, 740), based on some of their attributes, fall into some clusters (720). For a given cluster (720), there is at least one process instance (710 or 740) with an attribute value corresponding to this cluster. As the clusters (720) can overlap, a process instance can correspond to several clusters. For each cluster (720) is associated a behavior model, or WFST (730) in an implementation of the main embodiment, which maps onto the process definition (700) with extra information related to the probability that a transition occurs (for instance 637).

The data model shown in FIG. 7 can be implemented in various databases. While a classic relational database can be used as the BPM database (20) for storing this process data, as processes are often modeled in XML, a database with advanced XML functionalities can also be used. The exact list of fields for the data model can be derived easily by the person skilled in the art.

Figure 8:
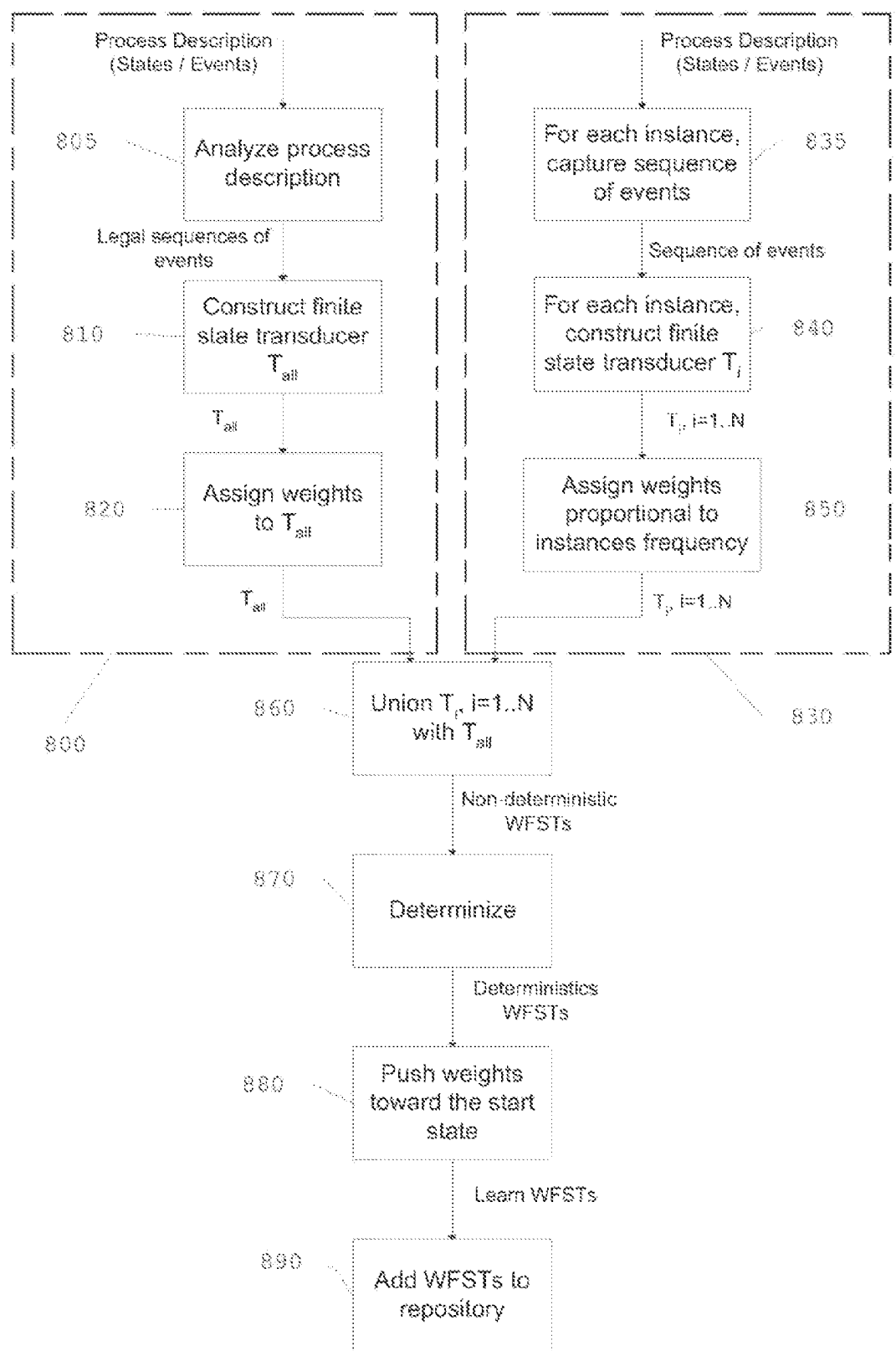
FIG. 8 shows a method for learning a WFST associated with a cluster, in an implementation of the present invention.

FIG. 8 shows a method for learning a WFST associated with a cluster, in an implementation of the main embodiment. The method comprises two main steps: learning the possible sequences of events (800); and learning the weights associated with each event (830).

The learning the sequences of events comprise several steps: analyzing the process description (805); constructing a finite state transducer (810); and assigning weights to the finite state transducer (820). The weights learning comprises: capturing the sequence of events for each instance (835); constructing the finite state transducer for each instance (840); and assigning weights proportional to instances frequency (850).

To produce the final behavior model, the method further comprises: unioning or combining (860) the transducers corresponding to each sequence of events; determining (870) the resulting weights of the combined transducers; pushing the weights towards the start state (880); and adding (890) the so determined WFST to the repository (135).

Learning the WFST associated with a cluster of process instances involves two steps: learning the sequence of events associated with each cluster (800), and learning the weights associated with each event (830). FIG. 8 shows the details of this process.

To learn the possible sequence of events, the method uses the predefined process description (700) to extract (805) the legal sequences of events and uses these sequences to construct (810) a finite state transducer $T_{all}$ (730). The finite state transducer extracted from the sample business process description is described in more details with respect to FIG. 9.

The method uses $T_{all}$ and the behaviors of past instances (710) that belong to some cluster (720) to learn a behavior model (730) for that cluster. The method first captures (835) the flow of events executed by each instance in the cluster from the events log. The behavior of each instance is represented (840) by a finite state transducer, $T_i$. A finite state transducer $T_i$ that represents the sequence of business activities associated with a sample business process instance $P_i$ is described in more details with respect to FIG. 10.

The method assigns (850) for each transducer $T_i$ a weight proportional to the frequency of occurrence of the associated instances in the past. This weight represents a measure of normality for the transducer $T_i$.

The method merges the finite state automata of past instances into a deterministic weighted finite state automaton as follows: assign (820) for each legal sequence in $T_{all}$ a small weight (a small measure of normality), an example of this step is described with respect to FIG. 11a; union (860) all transducers $T_i$, i=1 ... N with $T_{all}$, an example of this step is described with respect to FIG. 11b; determine (870) the resulting transducer, an example of this step is described with respect to FIG. 11c; and push the weights toward the start state (880), an example of this step is described with respect to FIG. 11d.

The above process produces a WFST that contains all legal sequences that may be executed by the process. Each legal sequence is assigned a weight proportional to its frequency of occurrence in the past instances. The legal sequences in $T_{all}$ that do not appear in the past instances are assigned a small normality measure compared to other sequences. The determining step is required such that the resulting WFST has a single normality measure for each legal sequence. Pushing the weights towards the start state allows the method to predict anomalous behavior patterns as discussed with respect to FIG. 12.

The resulting WFST represents the normal behavior of the process learnt from information about past instances.

This implementation focuses on state diagrams, but the skilled person can easily derive an implementation for activity oriented processes, or any process based on a directed graph.

Furthermore, all the described steps are not mandatory, and an implementation of the main embodiment can comprise fewer steps. Thus the step of pushing the weights toward the start state is only here to allow for easier detection of anomalous processes, and this embodiment could be implemented without this step.

Figure 9:
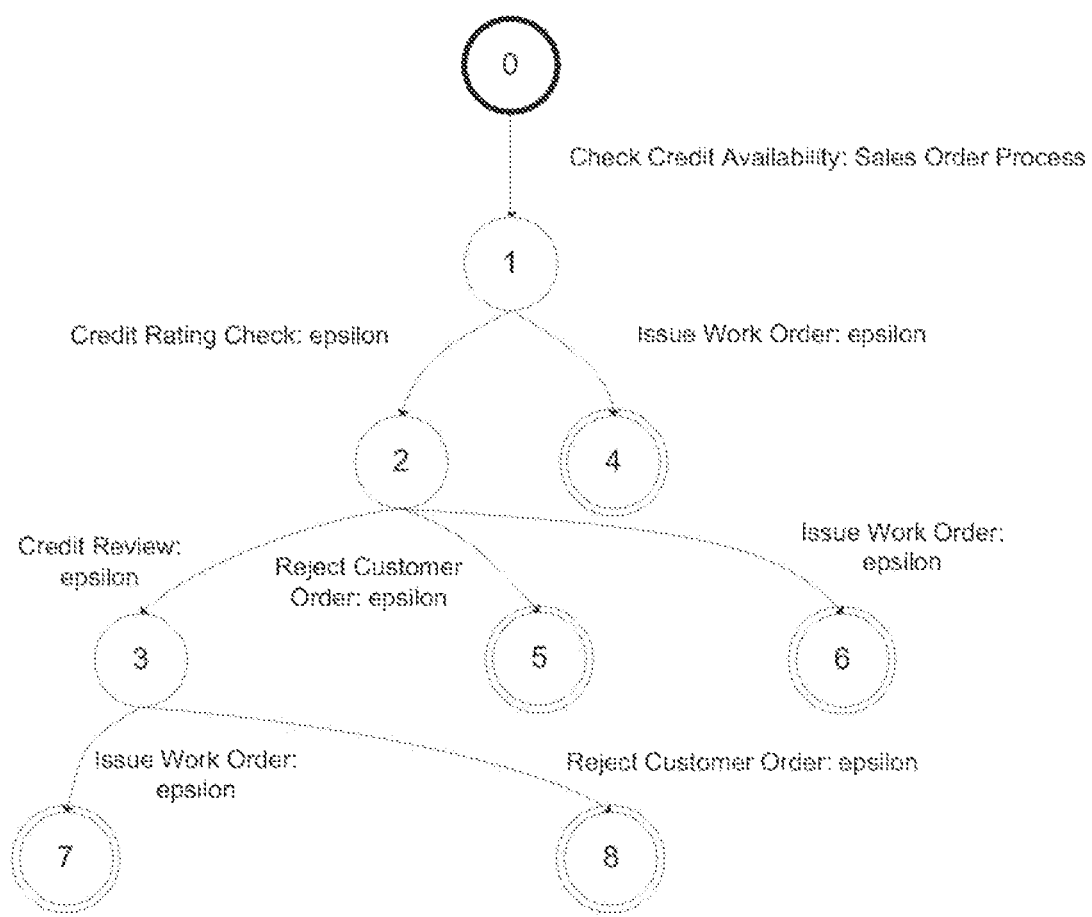
FIG. 9 shows a finite state transducer representing all the legal sequences of events in a process definition, in an implementation of the present invention.

FIG. 9 shows a finite state transducer representing all the legal sequences of events in a process definition, in an implementation of the main embodiment. The transducer shown in FIG. 9 corresponds to a process description (212) and is the first input for learning the behavior model (230) and producing eventually the WFST described with respect to FIG. 6.

Figure 10:
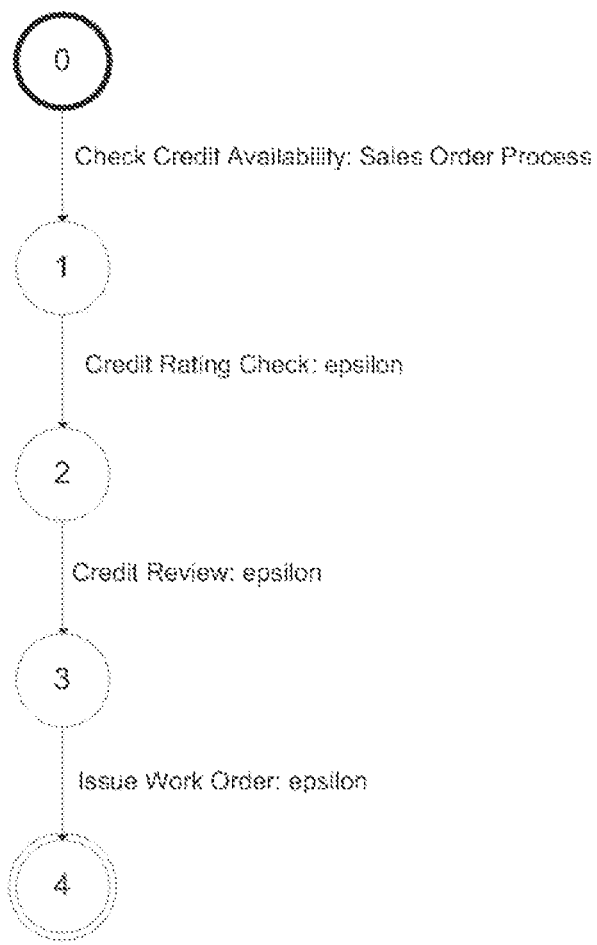
FIG. 10 shows a finite state transducer representing the behavior of a process instance, in an implementation of the present invention.

FIG. 10 shows a finite state transducer representing the behavior of a process instance, in an implementation of the main embodiment.

This sequence of states is a subset of all the possible sequences of steps, represented by a process description, with an example described with respect to FIG. 9.

While FIG. 10 shows a linear sequence of states, it is possible to have loops in the process and hence to have one or several states appearing several times in a particular process instance.

Figure 11A:
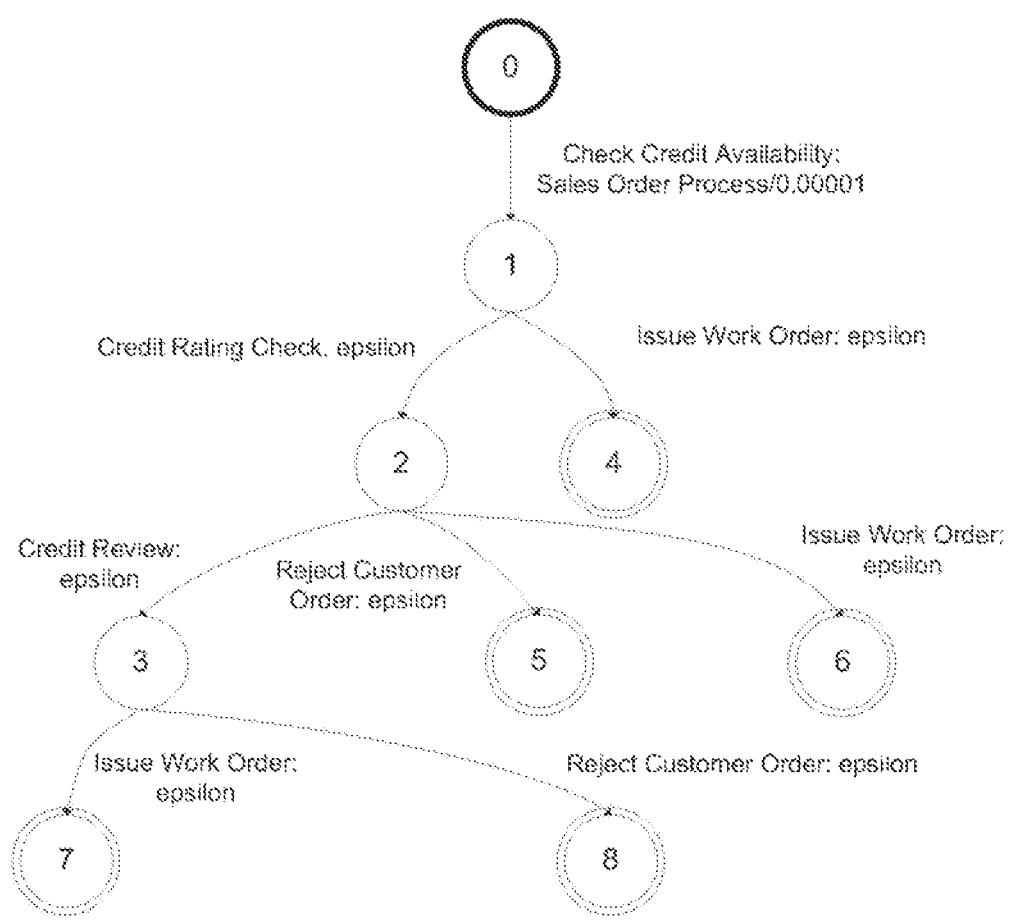
FIG. 11a shows the finite state transducer representing all the legal sequences of events, each legal sequence an arbitrary small weight, in an implementation of the present invention.

FIG. 11a shows the finite state transducer $T_{all}$ representing all the legal sequences of events, each legal sequence an arbitrary small weight, in an implementation of the main embodiment.

The goal is determine the likelihood that a particular sequence of steps is executed. The total number of difference sequences is, if there are no loops, equal to the number of final states. In the first step of determining the behavior model for a process, all the sequences are a priori equally likely or unlikely. Hence all transitions or activities are assigned a small probability, without normalizing to 1 the transitions leaving from a given state.

Figure 11B:
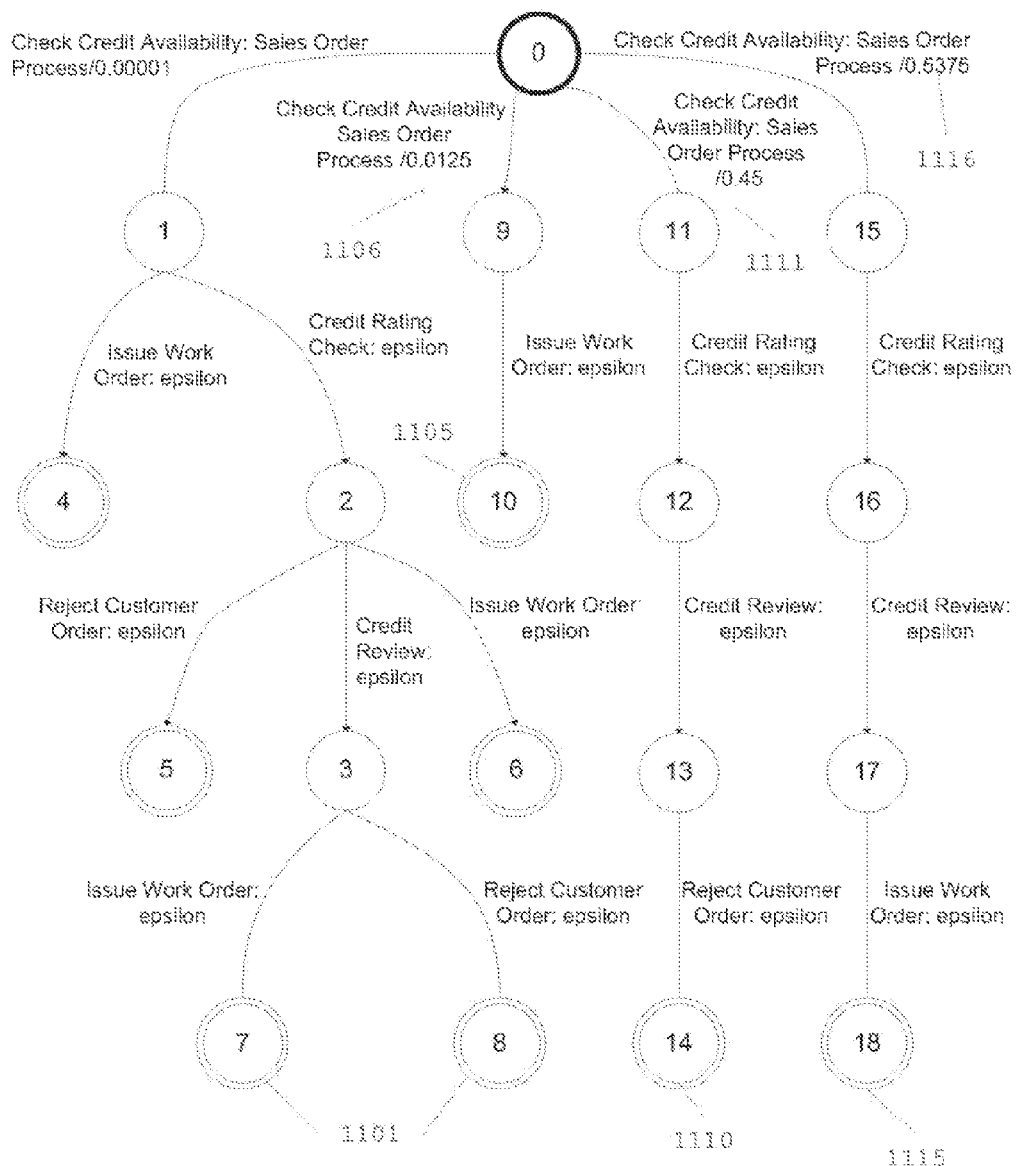
FIG. 11b shows the union of all the transducers representing a possible sequence of states in the process, in an implementation of the present invention.

FIG. 11b shows the union of all the transducers representing a possible sequence of states in the process, in an implementation of the main embodiment, comprising: tall (1101) with small probabilities for each sequence it represents, as described with respect to FIG. 11a; and the transducers $T_i$ (1105, 1110, 1115) resulting from the analysis of the past instances, step (830) described with respect to FIG. 8.

Each transducer $T_i$ has a weight proportional to the frequency of occurrence of the corresponding path. When a possible sequence of events doesn't occur, it has no corresponding $T_i$ transducer and is given a small weight in the $T_{all}$ transducer (1101).

For instance, the sequence of states (1105) was counted once out of a total of 80 process instances, it is thus given the weight 0.0125 (1106). Similarly, the sequence of states (1110), counted 36 times, is given the weight 0.45 (1111); and the sequence of states (1115), counted 43 times, is given the weight 0.5375 (1116).

As the sequences in $T_{all}$ (1101) are assigned an arbitrary weight, the sum of all weights are slightly above 1. This will be compensated in the step described with respect to FIG. 11d.

Figure 11C:
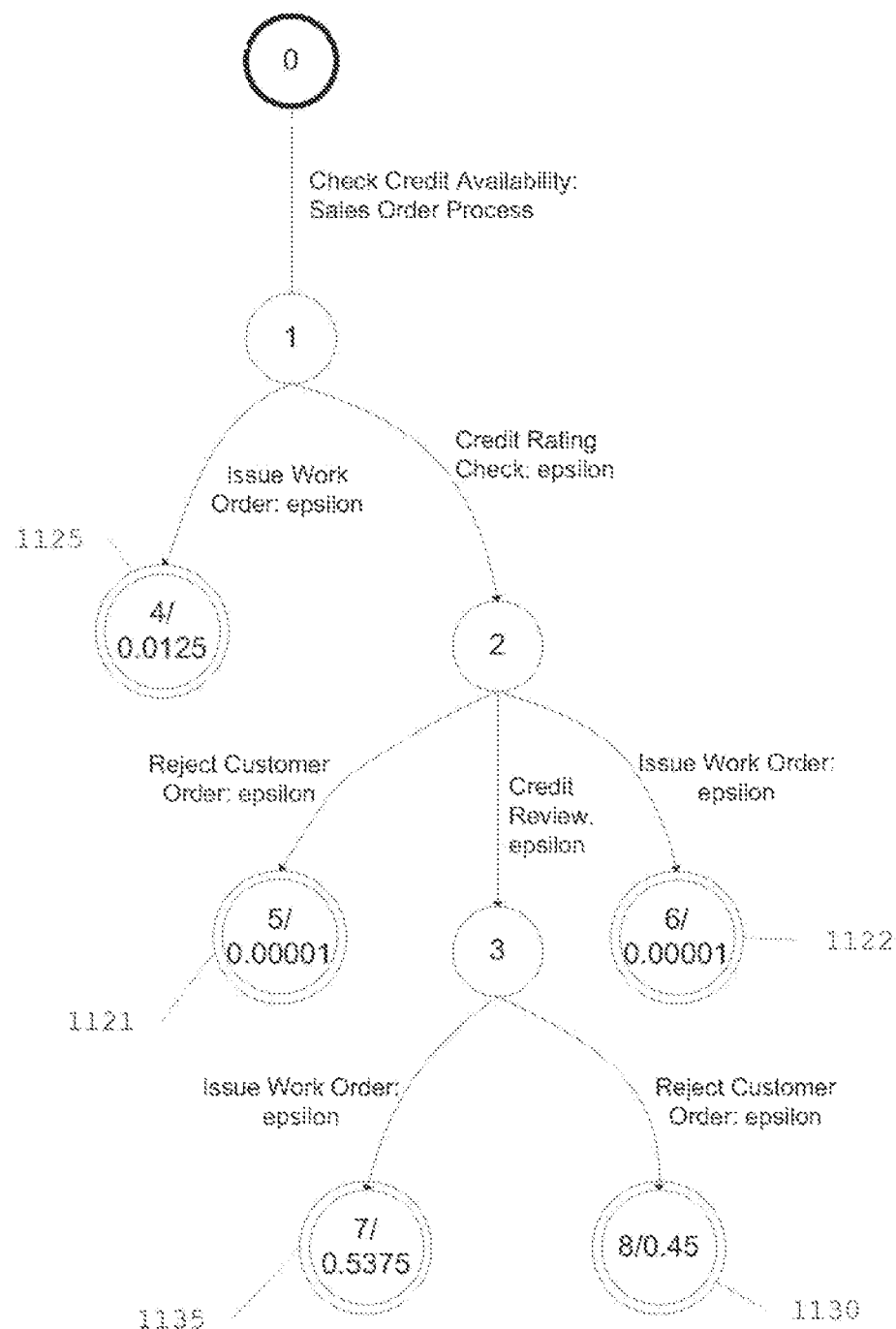
FIG. 11c shows the resulting transducer with the probability of occurrence of each path, in an implementation of the present invention.

FIG. 11c shows the resulting transducer with the probability of occurrence of each path, in an implementation of the main embodiment. With the process exemplified with respect to FIG. 9, there are 5 possible paths: a path corresponding to sequence of events (1105) with state (1125) as final state with a probability of occurrence of 0.0125, similar to (1106); a path corresponding to sequence of events (1110) with state (1130) as final state with a probability of occurrence of 0.45, similar to (1111); a path corresponding to sequence of events (1115) with state (1135) as final state with a probability of occurrence of 0.5375, similar to (1116); and two paths corresponding to sequences of events with no support in the past process instances, with states (1121) and (1122) as final states, and with weights derived from $T_{all}$ weights.

Given the transducer shown in FIG. 11c, it is then possible the likelihood of occurrence of any sequence of states a posteriori, i.e., once the complete sequence is executed.

Figure 11D:
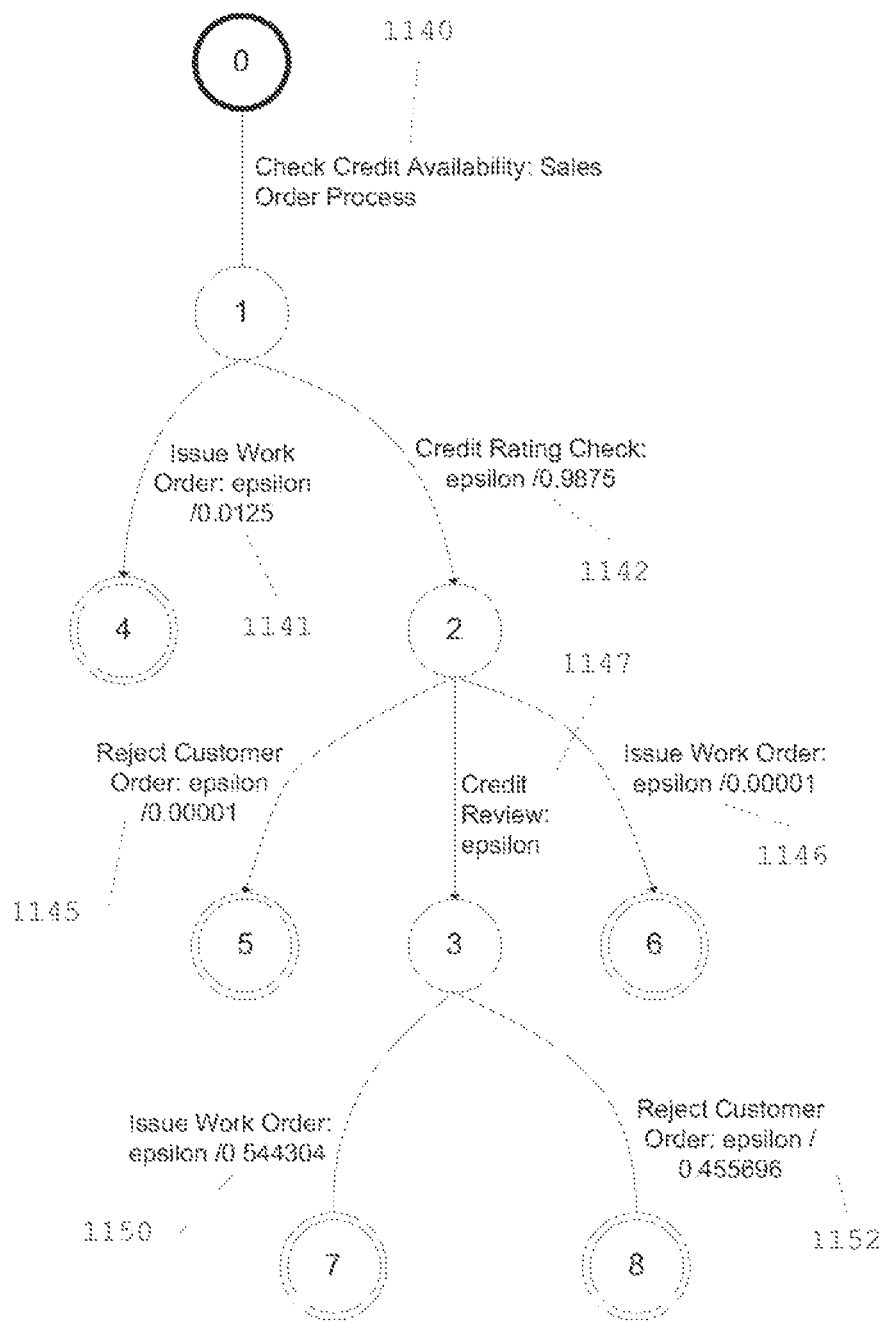
FIG. 11d shows the WFST with the weights pushed toward the start, in an implementation of the present invention.

FIG. 11d shows the WFST with the weights pushed toward the start, in an implementation of the main embodiment. The transducer comprises: a first transition (1140) which occurs in any legal sequence; two transitions (1141 or 1142) which occur alternatively, with corresponding weights summing to 1; after state marked "2", following activity (1142), three activities are possible, with two (1145, 1146) which are not supported in past instances, hence with an arbitrary weight (0.00001), small in comparison of the activities supported in the past instance, whose weights add to 1; and a third activity (1147) with weight epsilon to represent a no event transition to state marked "3"; after state marked "3", activities (1150) and (1152) have respectively weights 0.544304 and 0.455696, which sum to 1.

Thus, it is possible to know for each activity the likelihood that it occurs, without waiting for the process to finish up. Detection and prediction of anomalous behavior using a WFST such as the one shown in FIG. 11d will be described in more details with respect to FIGS. 12 and 14.

The activities weights are computed so that the probability that a path occurs, given by the product of the path activities weights, is equal to its occurrence frequency, as described with respect to FIG. 11b.

Figure 12:
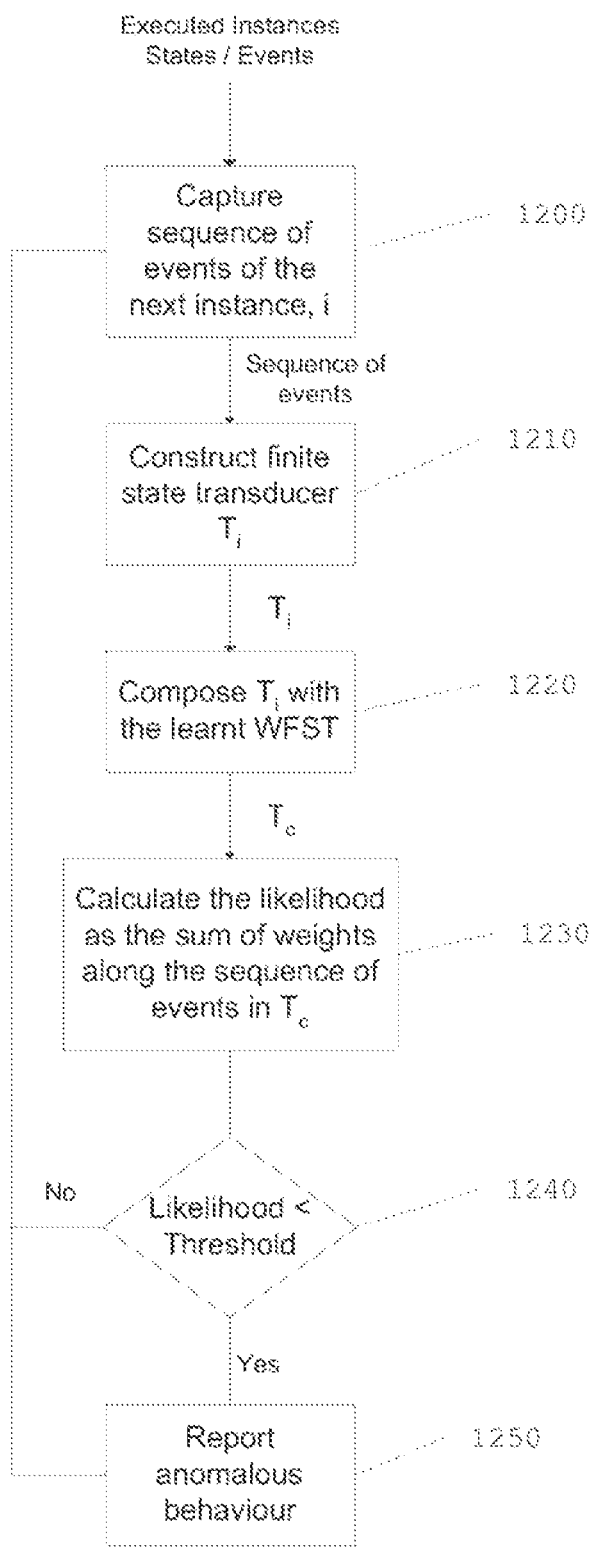
FIG. 12 shows a method for monitoring executed process instances using WFST and measuring their normality, in an implementation of the present invention.

FIG. 12 shows a method for monitoring executed process instances using WFST and measuring their normality, in an implementation of the main embodiment. Given an executed process instance named "i", the method comprises: capturing (1200) the sequence of events of the next instance "i"; constructing (1210) the corresponding finite state transducer $T_i$; composing (1220) $T_i$ with the learnt WFST to produce a transducer $T_c$; calculating (1230) the likelihood as the sum of weights along the sequence of events in $T_c$; checking (1240) whether the computed likelihood is above or below a threshold, and branch to first step on a new process instance if the likelihood is above, as the process instance is then normal; and reporting (1250) anomalous behavior if the computed likelihood is below the threshold.

In the run-time phase, the method uses the learnt WFSTs to evaluate run-time processes and classifies as anomalous any deviation from that behavior. An implementation of the main embodiment allows the detection of anomalous patterns in executed instances (off-line monitoring) and the prediction of anomalous patterns in running instances (on-line monitoring).

In off-line monitoring, the method shown in FIG. 12 uses the learnt WFSTs to evaluate executed instances. The method is repeated for each cluster.

Figure 13A:
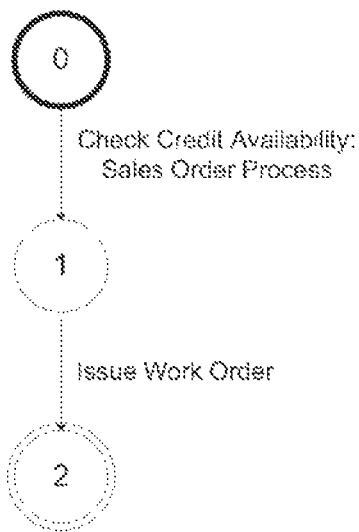
FIGS. 13a and 13b illustrate the computation of the measure of normality of a sequence of events, in an implementation of the present invention.
Figure 13B:
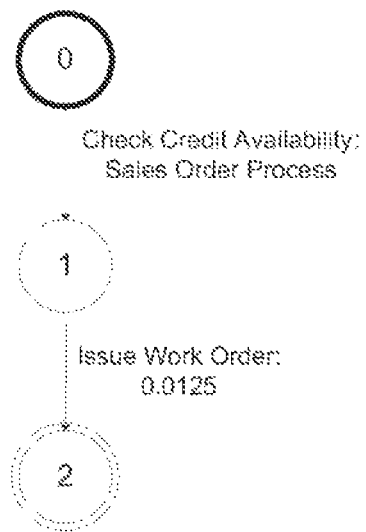

To calculate the probability that an instance with the associated properties/attributes exhibits the observed behavior using WFST operations, the observed behavior of the executed process instance is represented as a finite state transducer, $T_i$, with input and output labels representing the observed events. The finite state transducer of the observed behavior, $T_i$, is then composed with the learnt WFST. This step keeps only the sequence of events observed during the execution of instance along with the weight of each event. This measure of normality is calculated as the product of weights along the sequence of event in the resulting WFST. FIGS. 13a and 13b show the result of the composition step for the above sample business process.

Figure 15:
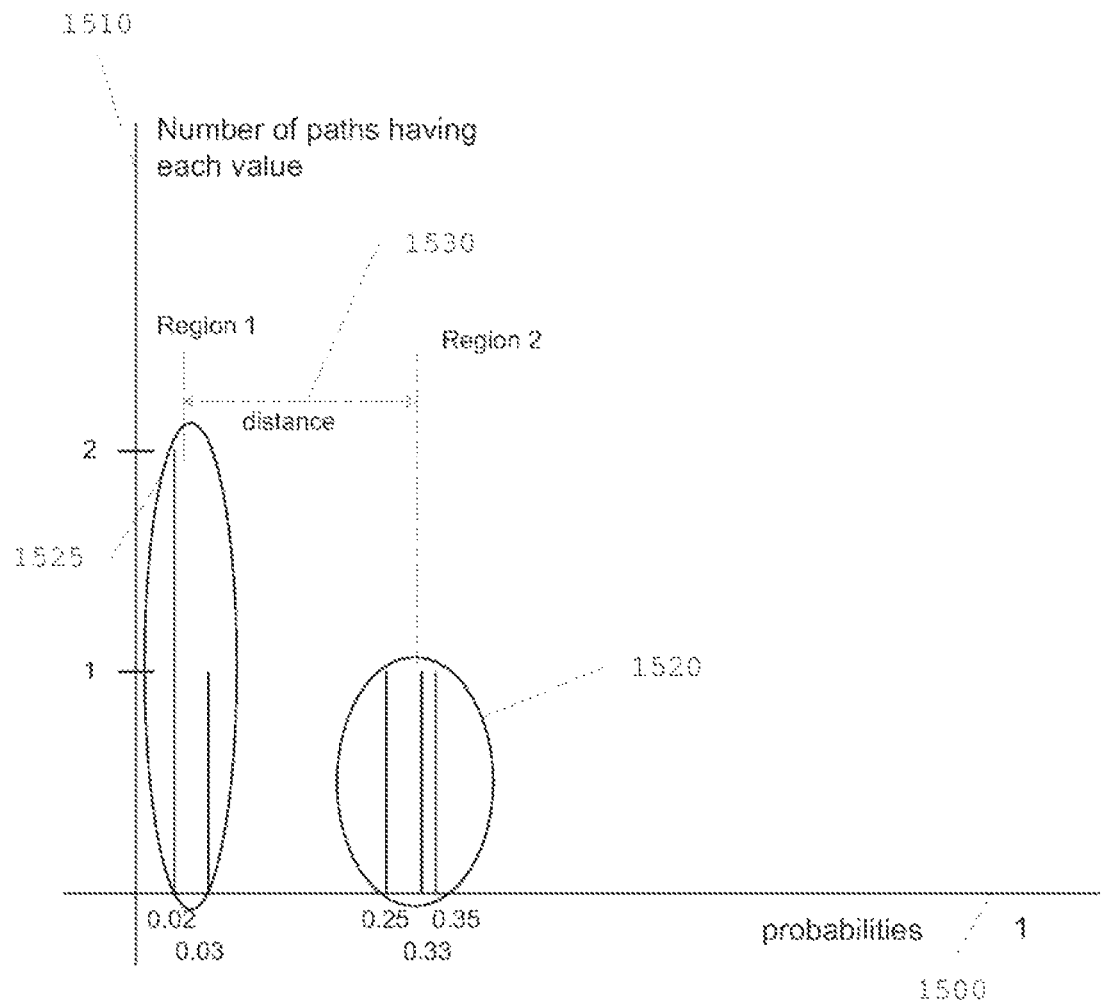
FIG. 15 illustrates the computation of the threshold for the normality measure, in an implementation of the present invention.

Computation of the threshold value using in step (1240) is described in more details with respect to FIG. 15.

FIGS. 13a and 13b illustrate the computation of the measure of normality of a sequence of events, in an implementation of the main embodiment. FIG. 13a shows an example of a transducer $T_i$ associated with an executed process instance, as described with respect to FIG. 12. FIG. 13b shows the result of the composition step (1220) described with respect to FIG. 12. The composed transducer comprises only the states of the executed instance with the weights of the learnt transducer (1141), described with respect to FIG. 11d.

Figure 14:
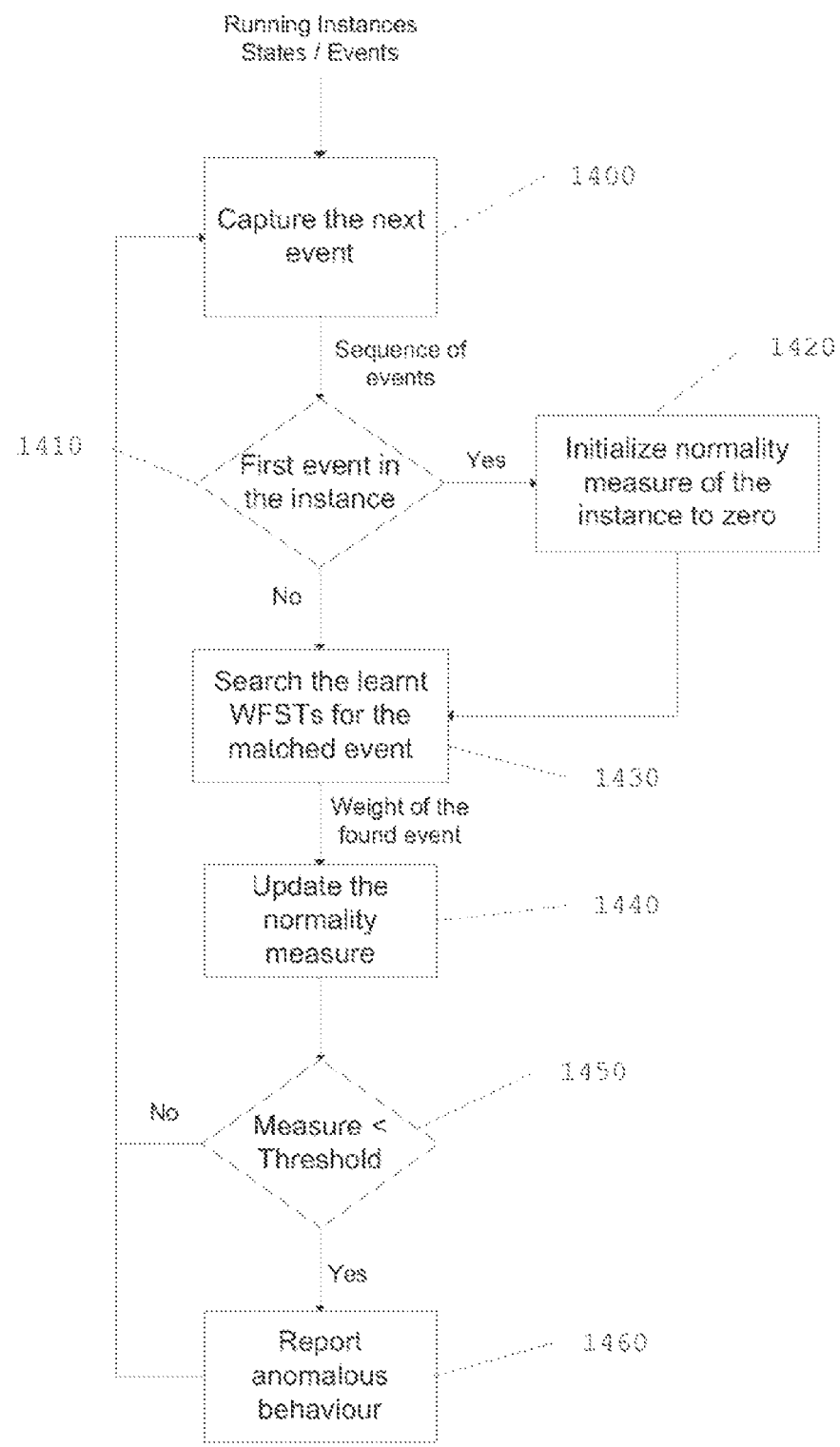
FIG. 14 shows a method for monitoring running process instances using WFST and measuring their normality, in an implementation of the present invention.

FIG. 14 shows a method for monitoring running process instances using WFST and measuring their normality, in an implementation of the main embodiment. The method comprises: capturing (1400) the next event from a running process instance; checking (1410) whether it is the first event in the instance; if it is, initializing (1420) the normality measure of the instance to zero; searching (1430) the learnt WFSTs for the matched event; updating (1440) the normality measure; checking (1450) whether the normality measure is below a given threshold; and reporting (1460) an anomalous behavior if it is, passing to the next running instance if not.

In on-line monitoring, the method predicts the anomalous behavior before the completion of the process instance. The computation of the normality measure is similar as for the executed process instance, the main difference being that the path doesn't stop at a final state. Hence only the weights associated with already executed activities will be taken into account to measure normality.

The method shown in FIG. 14 is repeated for each cluster.

The computation of the threshold value using in step (1450) is described in more details with respect to FIG. 15.

FIG. 15 illustrates the computation of the threshold for the normality measure, in an implementation of the main embodiment. FIG. 15 shows a histogram comprising: the probabilities of a path in a WFST as abscissa (1500); the number of paths having each probability (1510); a first group of paths (1520); a second group of paths (1525); and a distance between the two groups (1530).

A WFST has a limited number of possible paths. For instance, the WFST shown in FIG. 11d has 5 possible paths. Each possible path has a probability of occurrence, determined by the analysis of the executed processes. The computation of the likelihood of each path is described with respect to FIG. 11c.

In an implementation of this embodiment, the system uses the histogram of the probabilities of all paths to calculate a threshold value for each cluster as follows:

1. The system identifies two regions in the histogram such that
    The sum of probabilities in one region (1520) is greater than a first threshold T1 (say 90%) (this means that the sum of probabilities in the other region (1525) is less than <1−T1)
    The distance (1530) between the two regions is greater than a second threshold T2 (say 20%);
    where T1 and T2 are predefined values that can be tuned during the run-time phase based on feedback from users, adaptive analysis, number of paths, etc.
2. If these two regions do not exist, remove this cluster from the clusters space (this means that all paths in this cluster are normal).
3. Take the threshold value T between these two regions as follows:

$$T = \text{Max}(\text{Region2}) + (\text{Min}(\text{Region1}) - \text{Max}(\text{Region2})) * \text{SUM}(\text{Prob of Region2})$$

Choosing threshold values is a trade off between early detection of anomalous behavior and the probability of false alarms. High threshold values allow early detection of anomalous instances but increase the probability of false alarms while low threshold values decrease the probability of false alarms but cause late detection of anomalous instances.

Different scales, such as a logarithmic scale, can also be used for the abscissa, so as compensate for too many paths having a probability value close to 0: when a transducer has a great number of possible paths, the likelihood of each path tends to be smaller as they must all sum to 1. The threshold values (T1, T2, T) can be adjusted taking into account the scale used for the probabilities axis (1500).

The method can also improve the learnt models by using feedback about normal and anomalous instances with anomaly measures close to the threshold (i.e., instances with low confidence). The method presents these instances to domain experts and asks them to classify these instances as normal or anomalous. When the number of low confidence instances exceeds a predefined threshold, the method repeats the learning process using the events logs of all past instances.

Another embodiment comprises a method for learning a process behavior model based on a process past instances and on one or more process attributes, or a method for detecting an anomalous process using the corresponding process behavior model.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and a optical disk. Current examples of optical disks include compact disk-read only memory (CD-ROM), compact disk—read/write (CD-RAN) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method for monitoring executed process instances of a business process workflow, each process instance indicating an occurrence of the business process workflow and a sequence of events of a first process instance indicating a behavior of the first process instance, the method comprising:
identifying, by a server computer, a learned behavior model of the business process workflow, wherein the learned behavior model is a Weighted Finite State Transducer;
determining, by the server computer, based on the learned behavior model, the first process instance, wherein the first process instance is running;
determining, by the server computer, for the first process instance, a sequence of events for a second process instance;
calculating, by the server computer, a likelihood as a sum of weights along the sequence of events, the likelihood including only the weights associated with already executed activities;
determining, by the server computer, whether the likelihood is above a threshold value;
responsive to determining the likelihood is not above the threshold value, reporting, by the server computer, the sequence of events as anomalous behavior.

2. The method of claim 1, further comprising:
responsive to determining the likelihood is above the threshold value, proceeding, by the server computer, to a first step on a third process instance.

3. The method of claim 1, wherein the learned behavior is associated with at least one attribute value, and comprises a set of paths, wherein a path comprises a set of nodes and a set of transitions and a union of the paths form a directed graph corresponding to the business process workflow.

4. The method of claim 1, wherein the likelihood is obtained by multiplying the weights together.

5. The method of claim 1, further comprising:
determining, by the server computer, a plurality of attributes of the first process instance;
determining, by the server computer, a cluster to which the first process instance belongs;
determining, by the server computer, whether the first process instance enters a new state;
responsive to determining the first process instance enters the new state, calculating, by the server computer, a probability that each of a plurality of process instances in the cluster proceed through each of a same set of states that the first process instance proceeds through;
determining, by the server computer, whether the probability is above a threshold value; and
responsive to determining the probability is not above the threshold value, alerting, by the server computer, a user that the first process instance is anomalous.

* * * * *